United States Patent

Thuler

[15] 3,701,900
[45] Oct. 31, 1972

[54] DEVICE FOR ILLUMINATING FLAT CARRIERS WITH MARKINGS

[72] Inventor: Oscar Thuler, Berne, Switzerland

[73] Assignee: Canrad Precision Industries, Inc., New York, N.Y.

[22] Filed: June 11, 1969

[21] Appl. No.: 832,267

[52] U.S. Cl. ............... 250/71 R, 240/1 EL, 240/2.1, 250/72, 250/77
[51] Int. Cl. .............................................. G21h 3/02
[58] Field of Search ......... 250/71, 72, 77, 106, 106 S; 240/2.1, 1 EI

[56] References Cited

UNITED STATES PATENTS

| 2,256,595 | 9/1941 | Metcalf | 250/227 X |
| 2,428,792 | 10/1947 | Evans | 250/72 |
| 3,409,770 | 11/1968 | Clapham, Jr. | 250/106 X |

Primary Examiner—James W. Lawrence
Assistant Examiner—Davis L. Willis
Attorney—Blum, Moscovitz, Friedman & Kaplan

[57] ABSTRACT

A device for illuminating flat carriers in accordance with the invention, characterized by the fact that the light produced by a radioactive light source is radiated upon the carrier consisting of a transparent material, the radiated light being totally reflected by a part of a main surface of the carrier, one main face of the carrier being adapted to reflect or disperse light at areas where markings appear, or at any areas other than those of the markings, in order to allow the light which is reflected or dispersed at these areas to escape through the other main face of the carrier.

9 Claims, 14 Drawing Figures

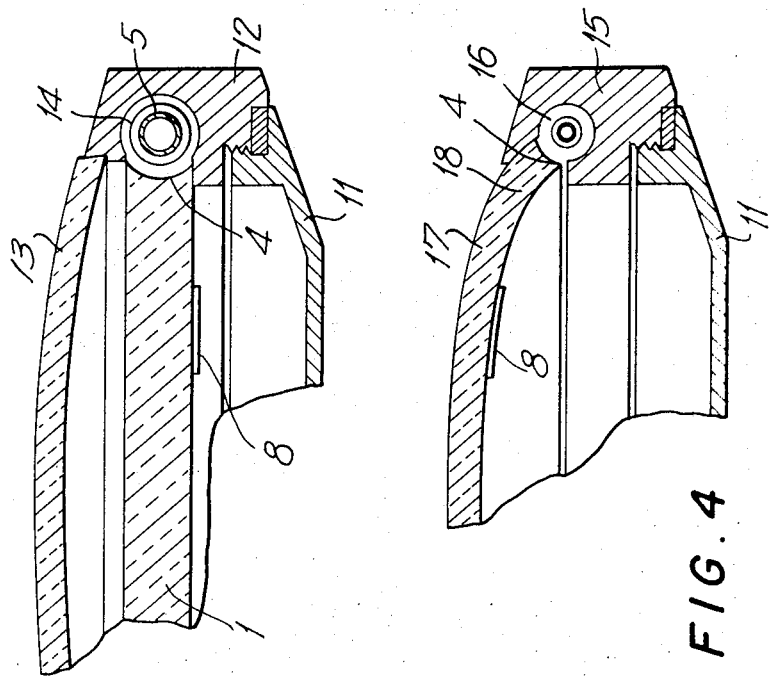
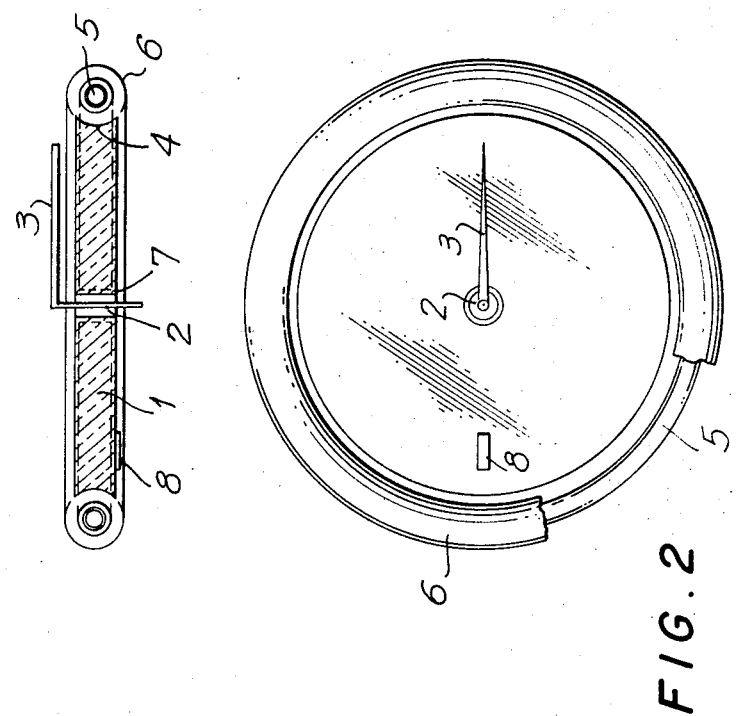

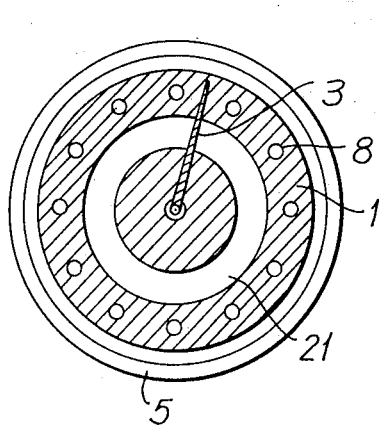
FIG.5
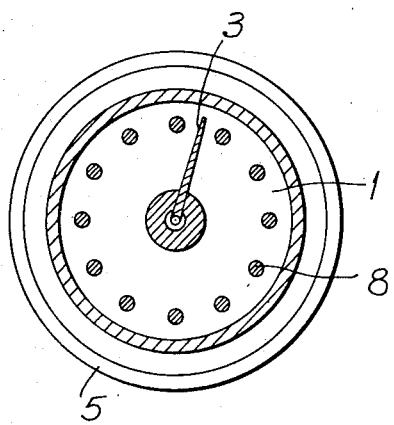
FIG.6
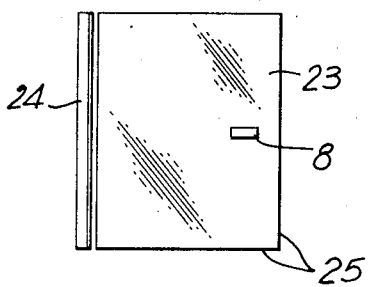
FIG.7
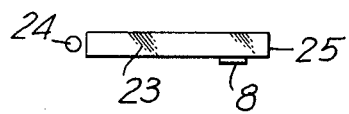
FIG.7a
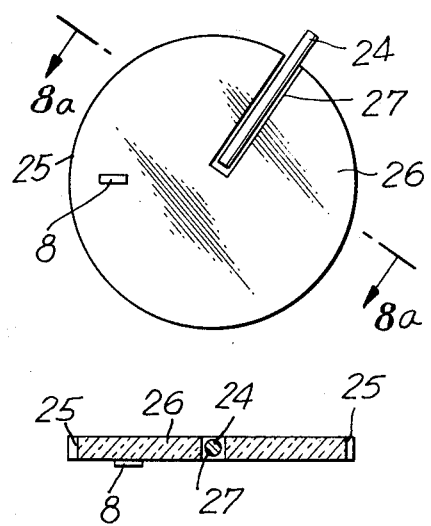
FIG.8
FIG.8a

DEVICE FOR ILLUMINATING FLAT CARRIERS WITH MARKINGS

BACKGROUND OF THE INVENTION

Radioactive light sources have been used in the past for making instruments readable in darkness, in particular portable instruments which cannot be connected to the mains. The oldest application is the watch with the face and the hands marked with a luminous paint incorporating radium. The luminous paint represents the radioactive light source and consisted in this instance of a luminophore, mostly zinc sulphide in powder form mixed with small quantities of radium mostly as sulphate, this mixture being applied with an organic bonding agent. Later, when other artificially produced radioisotopes were available, radium was replaced by representatives of these radioisotopes and the choice depended on criteria like half-life, radiotoxicity and economy. All these luminous substances were characterized by some disadvantages from the practical point of view, related to shorter luminosity and danger in handling, either as the consequence of slow destruction of luminosity of the luminophore or the loss of radioactive material content of the artificial radioisotopes through radiolysis.

INTRODUCTION TO THE DISCLOSURE

The present invention concerns a device for illuminating flat carriers provided with markings, in particular dials and graduated discs by means of radioactive light sources.

THE DRAWINGS

Referring to the drawings:

FIG. 1 shows a vertical section through a device for illuminating a disc-shaped dial by means of an annular radioactive light source;

FIG. 2 shows a plan view of the device illustrated in FIG. 1;

FIG. 3 shows a vertical section in detail of the embodiment of the device illustrated in FIG. 1;

FIG. 4 shows a vertical section in detail of another version of the device shown in FIG. 1;

FIGS. 5 and 6 each show plan views of two further embodiments of a dial or the like illuminated by an annular light source;

FIGS. 7 and 8 each show plan views of two further embodiments of a dial or the like with rod-like light sources;

FIGS. 7a and 8a show end elevations of the respective embodiments of FIGS. 7 and 8.

Figure 9:
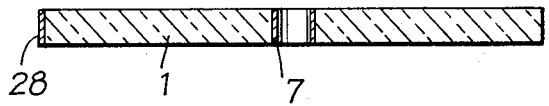
Figure 10:
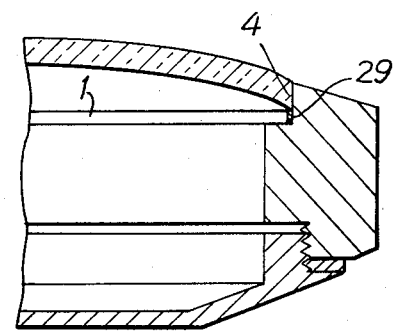
Figure 11:
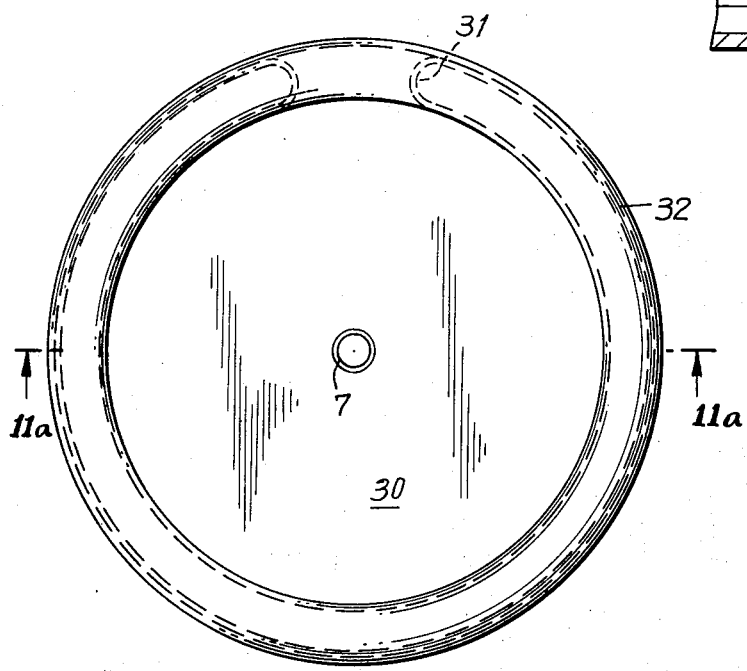

FIG. 9 is a cross-section of a rectangular dial having an edge coated with radioactive luminous paint;

FIG. 10 is a cross-section of a watch with a cover glass coated on its edge with radioactive luminous paint;

FIG. 11 is a plan view of a dial having a luminous tube at its edge; and

Figure 11A:
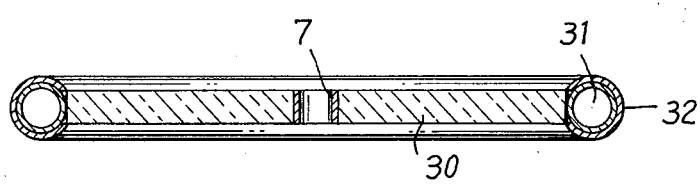

FIG. 11a is a sectional view taken along line 11a—11a of FIG. 11.

According to FIGS. 1 and 2, a disc-shaped dial 1 made from transparent material such as glass or plastic, the refractive index of which is much greater than 1, is arranged in a watch, the details of construction of the casing and time measuring parts of which are not shown, or in an indicator-type measuring instrument, the construction details of extraneous structural parts likewise not being shown. The dial 1 is provided in the usual manner with a central shaft or hole 2 for accommodating an indicator it being within the province of this invention to provide several shafts or holes 2 to accommodate additional indicators 3.

The dial 1 is surrounded along its narrow peripheral side 4 by an annular or torus-shaped radioactive light source 5 the section diameter of which is preferably smaller or at most equal to the thickness of the dial 1. The radioactive light source 5 consists of a hollow, fused glass body the inner walls of which are lined with a luminophore, e.g., zinc sulphide and the inner spaces of which are filled with a radioisotope such as tritium or Krypton which is gaseous at room temperature. The hollow glass body can also be filled with a powdered luminophore, the radioactive gas filling only the spaces between the grains of the luminophore.

The light source 5 which emits light in all directions is partly surrounded by the reflector 6 shaped in the form of an annulus which has been cut open and reflects the light radiated up, down and to the sides. Accordingly, the greatest part of the light emitted from the light source 5 enters the dial through its narrow periphery side 4 and is mostly captured within the dial due to total reflection. In order to prevent the loss of light through the shaft or hole 2, the said shaft or hole being provided with a reflecting lining 7 which can be applied to the inner peripheral surface thereof for example by metallization.

A light dispersing or reflecting mark 8 having the indicated shape or contour is arranged at those locations where an illuminated marking such as for example a numeral figure, indiced sign, graduation marking or similar designation is desired to be observed through the medium of (the term marking being hereinafter designated to define the same) the total reflection of the light directed at the dial 1 which is of itself not luminous. The light which enters the dial passes through its top face only at those locations where a marking is disposed. Such a marking can be applied for example with white paint or be formed by roughing the surface of the dial in order to cause the light to disperse. It may be of advantage to coat the projection or the depression therein with a layer of paint or metal in order to make the marking appearing through the transparent dial more visible in daylight.

The advantage of the arrangement of the illuminated marking 8 on the dial 1 over the usual application of luminous paint is that the face of the dial has no radioactive substances on it and that the markings can be economically prepared before they are applied to the dial, without having to apply luminous paint to them by hand afterwards. The arrangement of the annular, sealed light source 5 provides a special advantage by the fact that there are no open, radioactive layers and that the light source can be produced as a separate part of the watch or the instrument. This arrangement is also shown in FIGS. 11 and 11a where hollow, gastight, fused-glass tube 31 with its reflecting shield 32 is contiguous with the edge of dial 1.

Of course, it is possible to replace the annular, fused light source shown in FIGS. 1 and 2 by a layer of a known radioactive luminous paint applied in the form of a layer on the narrow periphery 4 of the dial 1. This embodiment is shown in FIG. 9 where radioactive, luminous paint 28 coats the edge of dial 1. Such a version always presents an advantage by the fact that all the individual marks on the dial are illuminated together by a single light source so that the laborious work of applying radioactive luminous paint on each mark, which is dangerous to health, can be avoided. The band of luminous paint layer can be applied to the narrow edge of the dial mechanically as by a machine. Since the edge of the dial is normally located inside a casing, most of the harmful radiation of this layer of luminous paint is suitably screened. The reflector 6 shown in FIGS. 1 to 4 is formed to advantage as part of a casing, in particular in the case of a watch.

FIG. 3 shows details of such an arrangement, where all parts not directly related to the illumination of the dial are omitted. A watch in which the illustrated device is shown in FIG. 3 has the usual base 11 which is screwed together with the casing ring 12. The cover glass 13 is inserted into the casing ring 12 on top of the watch. The inside of the casing ring 12 contains the transparent dial 1 but the means of fixing the dial in the casing ring are not shown here. The casing ring 12 is provided with the annulus 14 which is provided for supporting the annular light source 5 which has a fused glass body. The bottom of the dial 1 is again provided with the required markings 8 one of which is shown. It is evident that the casing ring of this design acts on the one hand as a reflector to cause light to enter through the narrow peripheral edge 4 of the dial 1 into the interior thereof and, on the other, as an effective screen for radioactive radiation from the light source 5 so that only an extremely small amount of radiation escapes through the cover glass 13.

A variation of the embodiment shown in FIG. 3 is characterized by the fact that the marks which can be read in darkness are not arranged on a separate dial located within the instrument but on the inside of the transparent cover glass of the instrument, a detail of such embodiment being shown in FIG. 4, again using an example a watch casing which has a casing ring 15 with the screwed cover 11. The casing ring 15 is again provided with the annulus 16 which is open at an oblique angle to the inside and to the top and serves the purpose of holding the annular fused light source 5. The transparent covering glass 17 has a curved edge 18 and is arranged in the casing ring 15 in such a way that the annular light source 5 rests along the narrow edge 4 of the cover glass 17. The inside face of the cover glass 17 is provided with the required markings 8 at which the light is directed from the light source 5 into the cover glass 17 and captured within the cover glass, total reflection being dispersed or reflected so that the markings 8 light up and are visible in darkness. If all the required markings are arranged on the cover glass of the variation illustrated here, no actual separate dial is required; alternatively, it can be arranged as a normal thin metal dial inside. Since the markings can be mechanically applied by a machine in batch production using an economic method, and require no extra work, such as in particular applying luminous paint on the individual markings aforesaid, frequent changing of the cover glass which may become necessary does not represent a disadvantage which would cause any extra costs.

The narrow periphery edge 4 of the cover glass 13 of the embodiment shown in FIG. 4 can, in a further embodiment (FIG. 10) be covered with a layer of radioactive luminous paint 29, the annulus 16 and the annular light source 5 being thereby eliminated.

The arrangements to provide illumination of the markings described above do not allow one or several indicators to be illuminated in the same way because the indicator is located outside the dial, as shown in FIG. 1. Therefore, different measures must be provided to make the indicators visible, it being possible to make the indicator or indicators luminous by covering them with luminous paints in the known way, and if the disadvantages of exposed luminous paint explained at the beginning are to be avoided, the indicator can be made visible for example in the following manner:

According to FIG. 5 which is a plan view of another embodiment of a dial, the transparent dial surrounded by the annular fused light source 5 is provided for example not only with markings 8 such as the hour figures but also with a circular band 21. This band is formed in the same way as markings 8, that is, for example, either by vapor metallization, by pressing on foil, raising, embossing or roughing the surface of the dial. Since the light enters the dial 1 sideways from the light source 5, the markings 8 and the strip 21 become illuminated while the other part of the dial 1 remains dark, as indicated by shading. The indicator 3 in the instance that it is made from an opaque material, will be visible in the luminous band 21 as a dark stroke in any position.

The embodiment shown in FIG. 6 represents a plan view of an inverted illuminating arrangement where the largest part of the dial 1 receiving light from the annular light source 5, directed from a side, is made luminous in the manner heretofore described before. The markings 8 are dark in this instance, having been formed for example by being excluded from areas treated by metal vaporization or areas which are roughened. The opaque indicator 3 is then visible above the luminous part of the dial 1.

A further possibility, although the same is not illustrated here, consists of the provision that at least the pin or shaft of the indicator is arranged as a fibrous, optical luminous line connected to the radioactive source of light and causes the indicator which is made suitably transparent and reflects or disperses light on one side.

The embodiments described here and other variants can of course also be used with dials or graduated discs which have a shape different than round. FIG. 7 shows a plan view looking upwards, while FIG. 7a shows an end view of a further embodiment of such an application in which a transparent dial or watch glass 23 is rectangular. Along one narrow edge, there is arranged a rod-like light source 24 consisting of a hollow, fused glass element the inside of which is coated or filled with a luminophore and a radioactive gas. The other narrow sides of the dial 23 are provided with a light reflecting coating 25. The bottom of the dial is provided with light dispersing or reflecting markings 8 in the way heretofor described, which make the light entering the dial and totally reflected within it to appear at these points.

Another embodiment with a rod-like light source 24 for a disc-like transparent dial 26 of any required shape is shown in FIG. 8 which shows a plan view thereof while FIG. 8a shows an end view. The dia 26 is provided with a radial slot 27 or even a radial bore in which the rod-like light source 24 is arranged to radiate the light into the dial from the side. The outer narrow edge of the dial 26 is in this case again provided with reflecting coating 25 and its bottom face with light reflecting or dispersing markings 8. In addition, the uper side of the slot 27 or the bore or the upper and the bottom side is provided with a reflecting coating (not shown). Since the diameter of the glass element of the light source 24 can be vary small, e.g., 1 mm, the latter reflecting coating will not interfere with the top surface of the dial.

If the dial of the embodiments described above is to be transparent down to the bottom face only, looking from the top, but the parts of the instrument arranged underneath the dial are not to be visible, a cover plate may be arranged underneath the dial but at a distance from its bottom surface.

The radioactive light source, in particular one having a fused glass body, must not necessarily be arranged along one or another narrow edge of the dial for the light to be radiated into the dial from the side. Moreover, it is also possible to arrange the light source at another place in the instrument and to guide the light emitted by the light source to the narrow edge of the dial through reflecting, for example, totally reflecting and fibro-optic aids. For example, the narrow edge of the transparent carrier (dial, cover glass) can be arranged as a bevelled reflective face. The radioactive source of light is then arranged on the underside or on top of the carrier, in its peripheral zone so that the light enters the inside of the carrier from the side generally at right angles to the face, and is reflected inside at the inclined face of the narrow edge and then captured by total reflection at both faces within the above type of carrier.

What is claimed is:

1. A device for illuminating transparent carriers having a narrow edge and a plurality of main surfaces, comprising a radio-active light source contiguous with at least a portion of said edge of said carrier; and marking upon selected zones of a main surface of said carrier, said marking serving to reflect and disperse light from said light source through another of said main surfaces, thereby producing a visible differentiation between unmarked and marked zones.

2. A device in accordance with claim 1, wherein the radio-active light source comprises a hollow, gas-tight, fused glass body, the hollow space of which contains a luminophore and a radio-isotope selected from the group consisting of tritium and krypton.

3. A device in accordance with claim 1 wherein said marking on selected zones consists of a coating of light-colored paint.

4. A device in accordance with claim 1 wherein said marking on selected zones consists of roughing.

5. A device in accordance with claim 1 wherein said marking on selected zones consists of raised areas.

6. A device in accordance with claim 1 wherein said marking on selected zones consists of depressed areas.

7. A device in accordance with claim 1 wherein the carrier is a cover glass of an instrument, having markings thereon.

8. A device in accordance with claim 1 wherein that portion of the edge of the carrier through which no light passes into the carrier is provided with a reflecting layer.

9. A device in accordance with claim 1 wherein the radio-active light source consists of a layer of radioactive luminous paint applied to at least a portion of said narrow edge of the carrier.

* * * * *